United States Patent
Volny et al.

(10) Patent No.: US 9,957,054 B2
(45) Date of Patent: May 1, 2018

(54) TELESCOPING EVACUATION SLIDE

(71) Applicant: GOODRICH CORPORATION, Charlotte, NC (US)

(72) Inventors: Jaro S. Volny, Phoenix, AZ (US); Drew Hartman, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 39 days.

(21) Appl. No.: 14/814,309

(22) Filed: Jul. 30, 2015

(65) Prior Publication Data

US 2017/0029127 A1  Feb. 2, 2017

(51) Int. Cl.
*B64D 25/14* (2006.01)
*A62B 1/20* (2006.01)

(52) U.S. Cl.
CPC ............... *B64D 25/14* (2013.01); *A62B 1/20* (2013.01)

(58) Field of Classification Search
CPC .............. B64D 25/14; A62B 1/20; A62B 1/22
See application file for complete search history.

(56) References Cited

U.S. PATENT DOCUMENTS

| | | | | |
|---|---|---|---|---|
| 3,339,690 A | * | 9/1967 | Craig | B64D 25/14 182/48 |
| 4,589,519 A | * | 5/1986 | Hunter | A62B 1/20 182/2.11 |
| 4,732,233 A | * | 3/1988 | Melander | A62B 1/20 182/48 |
| 4,887,780 A | * | 12/1989 | Goodrich | B64G 1/14 244/137.2 |
| 8,708,101 B2 | * | 4/2014 | Bambrick | A62B 1/20 182/18 |
| 2005/0230542 A1 | * | 10/2005 | Farnsworth | B64D 11/003 244/118.5 |
| 2008/0191097 A1 | * | 8/2008 | McDonald | B64D 25/14 244/137.2 |
| 2008/0223656 A1 | * | 9/2008 | John | A62B 1/20 182/48 |
| 2013/0213737 A1 | * | 8/2013 | Bambrick | A62B 1/20 182/18 |

FOREIGN PATENT DOCUMENTS

| | | | | |
|---|---|---|---|---|
| EP | 0471958 | | 2/1992 | |
| EP | 1410987 | | 4/2004 | |
| GB | 2231314 A | * | 11/1990 | ............... A62B 1/20 |
| GB | 2382301 A | | 5/2003 | |

OTHER PUBLICATIONS

Extended European Search Report dated Dec. 8, 2016 in European Application No. 16181993.3.

* cited by examiner

*Primary Examiner* — Daniel P Cahn
*Assistant Examiner* — Shiref M Mekhaeil
(74) *Attorney, Agent, or Firm* — Snell & Wilmer L.L.P.

(57) ABSTRACT

Disclosed is an emergency slide system comprising a slide having a telescoping structural support, and a slide surface. The emergency slide system further comprises a gas deployment device comprising a gas generator, compressed gas cylinder, or both. The gas deployment device may further include an aspirator, according to various embodiments. The telescoping structural support provides a more compact and quickly deployable system.

8 Claims, 7 Drawing Sheets

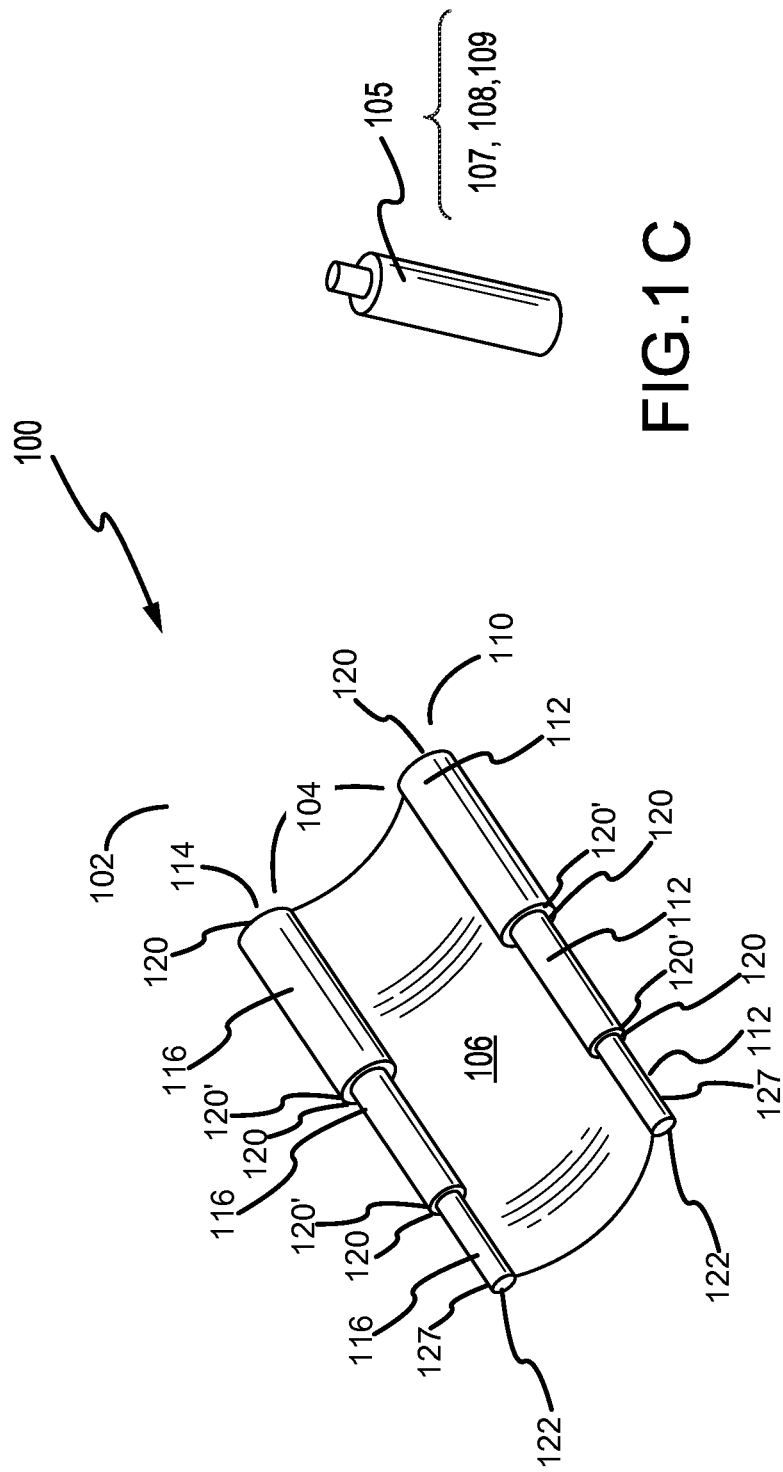

TELESCOPING EVACUATION SLIDE

BACKGROUND

Typical evacuation systems employing emergency slides benefit from quick deployment as well as efficient packability of the slide in the door of the aircraft. Additionally, most typical slides used for aircraft evacuation are inflated in order to deploy, which may be time consuming.

SUMMARY

In accordance with various embodiments, disclosed is an emergency slide system comprising a slide having a telescoping structural support, and a slide surface. The emergency slide system further comprises a gas deployment device comprising a gas generator, compressed gas cylinder, or both. The gas deployment device may further include an aspirator, according to various embodiments. The telescoping structural support provides a more compact and quickly deployable system.

In accordance with various embodiments disclosed is an emergency slide system comprising a slide including a telescoping structural support, and a slide surface; and a gas deployment device configured to deploy said slide, wherein said telescoping structural support comprises a first rail and a second rail in bordering engagement with said slide surface, said first rail comprising a first set of telescoping segments, and said second rail, comprising second set of telescoping segments.

According to one embodiment, said first set of telescoping segments, and said second set of telescoping segments each comprise a series of interlocking nested tubes having a closed bottom end and an open top end.

According to another embodiment, said interlocking nested tubes have a square or circular cross section. According to another embodiment, deployment of said telescoping segments is effectuated by forcing gas through said open end.

According to another embodiment, said gas deployment device is configured to force gas through said open end. According to another embodiment, said slide surface comprises a fabric wrap configured to envelope said telescoping structural support. According to another embodiment, corresponding telescoping segments of said first set of telescoping segments and telescoping segments of said second set of telescoping segments are attached to one another.

According to another embodiment, said slide surface is attached between rails to each of said telescoping segments, at attachment sites on said telescoping segments. According to another embodiment, said emergency slide system is a component of an aircraft. According to another embodiment, said gas deployment device comprising a gas generator, a compressed gas cylinder, or a combination thereof. According to another embodiment, said gas deployment device further comprises an aspirator. According to another embodiment, said gas deployment device comprises a gas generator, a compressed gas cylinder, and an aspirator.

According to another embodiment, said emergency slide system is configured to pack within a compartment of an aircraft. According to another embodiment, said emergency slide system is configured to deploy automatically upon opening said storage compartment.

According to another embodiment, the emergency slide system further comprises a tie between said first rail and said second rail.

In accordance with various embodiments, disclosed is an emergency slide system comprising a slide including a telescoping structural support, and a slide surface; and a gas deployment device configured to deploy said slide, wherein said telescoping structural support comprises a first rail and a second rail in bordering engagement with said slide surface, said first rail comprising a first set of telescoping segments, and said second rail, comprising second set of telescoping segments, wherein said first set of telescoping segments, and said second set of telescoping segments each comprise a series of interlocking nested tubes closed bottom end and an open top end.

According to one embodiment, deployment of said telescoping segments is effectuated by forcing gas through said open end.

In accordance with various embodiments, disclosed an emergency slide system comprising: a slide including a telescoping structural support, and a slide surface; and a gas deployment device configured to deploy said slide, said gas deployment device comprising a gas generator, a compressed gas cylinder, or a combination thereof, wherein said telescoping structural support comprises a first rail and a second rail in bordering engagement with said slide surface, said first rail comprising a first set of telescoping segments, and said second rail, comprising second set of telescoping segments.

According to one embodiment, said gas deployment device further comprises an aspirator. According to another embodiment, the emergency slide system is configured to deploy automatically upon opening of a compartment in which the emergency slide system is stored.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein:

FIGS. 1B and C show an emergency slide system, according to various embodiments;

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
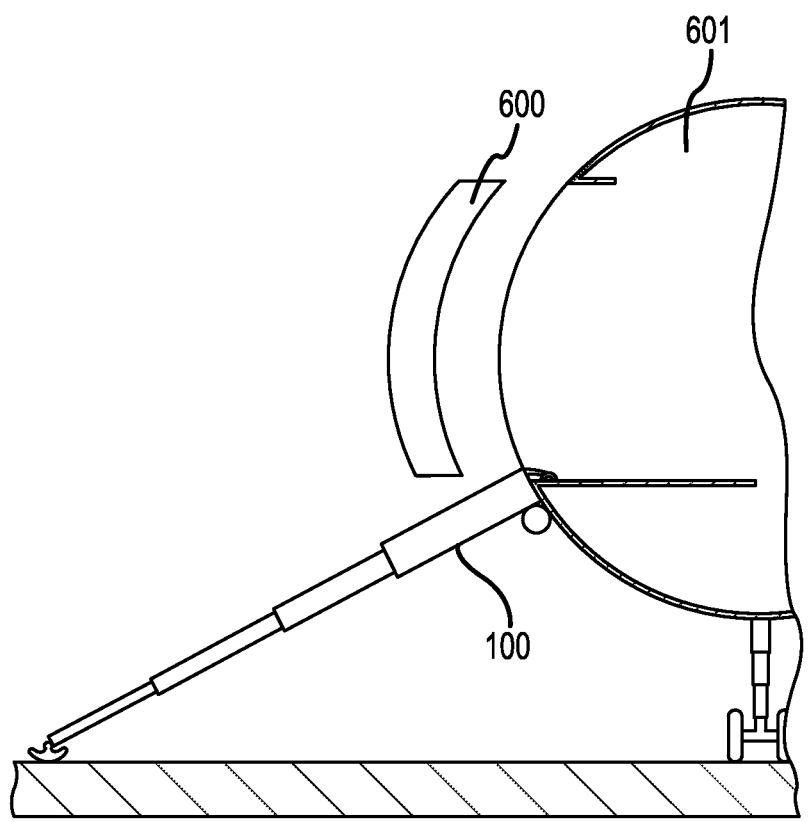
FIG. 1A shows an aircraft comprising an emergency slide system, according to various embodiments.

With reference to FIGS. 1A and 1B, in accordance with various embodiments, disclosed is an emergency slide system 100 comprising a slide 102 having a telescoping structural support 104 and a slide surface 106. Emergency slide system 100 further comprises a gas deployment device 105 configured to deploy said emergency slide system 100, comprising a gas generator 107, compressed gas cylinder 108, or both. Gas deployment device 105 may further include an aspirator 109, according to various embodiments. Emergency slide system 100 may be used during aircraft evacuation, as well as evacuation for ships and building structures, according to various embodiments.

Figure 2:
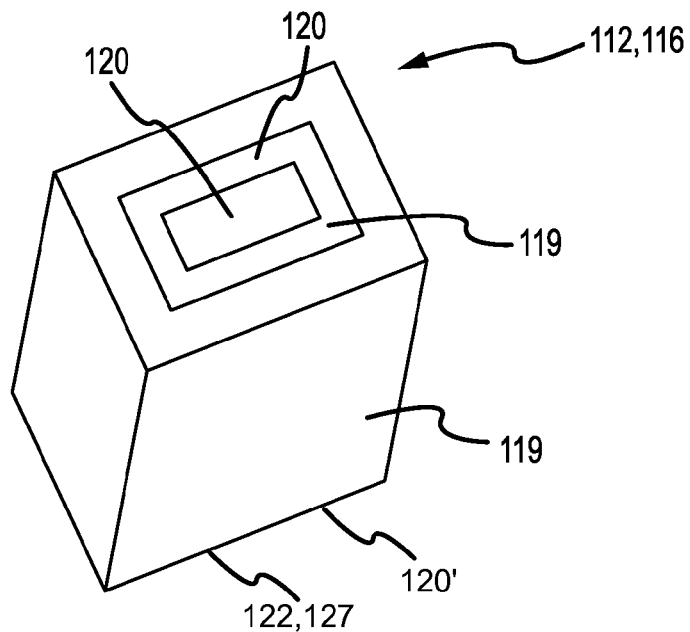
FIG. 2 illustrates the telescoping segments of an emergency slide system, according to various embodiments.

According to various embodiments, telescoping structural support 104 comprises a first rail 110 and a second rail 114, in bordering engagement with surface 106. The first rail 110 comprises a first set telescoping segments 112 and the second rail 114 comprises second set of telescoping segments 116, corresponding to the first set of telescoping segments 112. With reference to FIG. 2, first set of telescoping segments 112, and second set of telescoping segments 116 are each a series of interlocking nested hollow tubes 119, with each tube having a top open end 120 and an opposite bottom open end 120', except for the bottom end 122 of the smallest tube 127 being closed. According to various embodiments, tubes 119 may be interlockable via opposite turned interlocking lips or rims (i.e. inwardly turned rims on the bottom ends 120' of each tube (except for the bottom tube), and outwardly turned rims on the top ends 120 of each tube (except for the top tube), wherein the inwardly turned rims interlock with the outwardly turned rims of successive tubes 119 to form a seal therebetween). Various tube cross section geometries may be utilized, such as square, circular, I-beam, or other hollow structures, according to various embodiments. Deployment of telescoping segments 112 and 116 is effectuated by forcing gas through the top open end 120 against closed bottom end 122, via gas deployment device 105, thus forcing the nested tubes to telescope (i.e., translate outward). Telescoping structural support 104 may be formed from a rigid material such as aluminum, steel, carbon fiber composite material, or a suitable nano-composite material, according to various embodiments.

Figure 3:
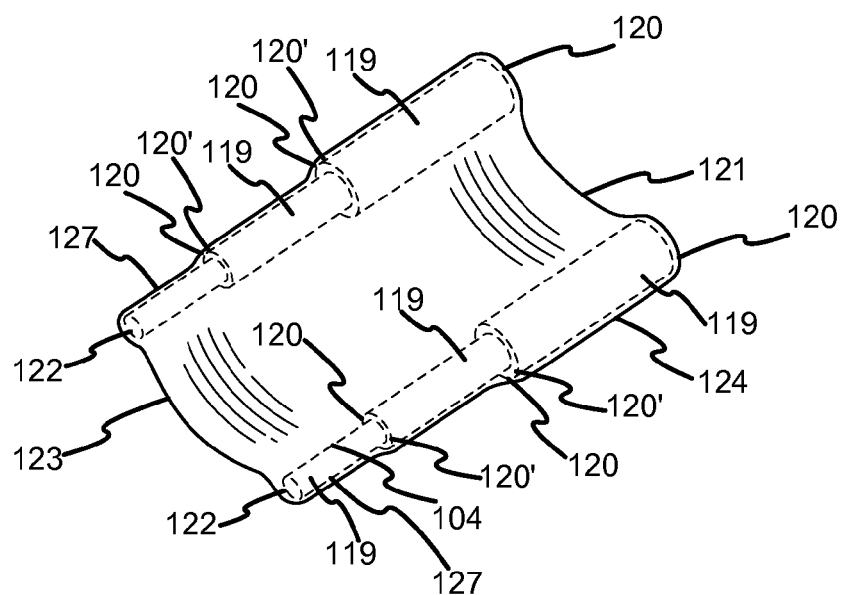
FIG. 3 illustrates an emergency slide system comprising a fabric wrap, according to various embodiments.
Figure 4:
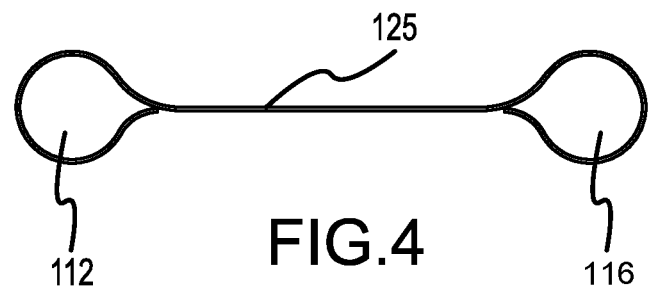
FIG. 4 illustrate the telescoping segments of an emergency slide system comprising an attachment, according to various embodiments.

According to various embodiments, slide surface 106 comprises a fabric, which folds and deploys along with the structural support 104. With reference to FIG. 3, according to various embodiments, slide surface 106 may comprise a fabric wrap 124 having a closed bottom end 123, and an opened top end 121, configured to envelope structural support 104, wherein it would be compressed in an "accordion style" configuration in a packed state. Fabric wrap 124 may overlay first and second rails 110 and 114, while providing slide surface 106 therebetween. In various embodiments, and with reference to FIG. 4, corresponding telescoping segments of first set of telescoping segments 112 and second set of telescoping segments 116 may be attached to one another via flexible or rigid attachment segments 125 (e.g. seam tape, and the like). Additionally, fabric wrap 124 may be attached to first and second rails, according to various embodiments.

Figure 5:
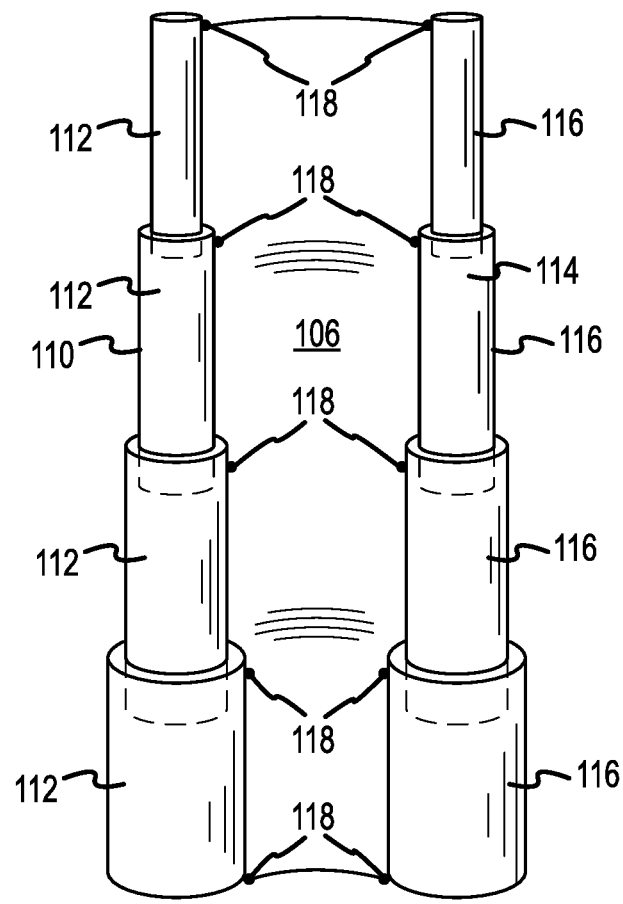
FIG. 5 illustrates a slide surface connected between the telescoping segments of an emergency slide system, according to various embodiments.

According to various embodiments, slide surface 106 may be attached between rails 110, 114, by attachment to each of the telescoping segments, 112, 116 via attachment sites 118 on telescoping segments 112 and 116 (e.g. via grommets and hooks), according to various embodiments (see FIG. 5).

A suitable material for slide surface 106 may include a urethane rip stop material and/or a nylon based cloth with a urethane coating. According to various embodiments, a single lane slide for an aircraft may range from between 169 inches (4.2 m) to 400 inches (10.1 m) in length.

According to various embodiments, the length of an aircraft slide may range from 169 (4.2 m) inches to 450 inches (11.43 m), with a tube lengths of 9 inches (0.22 m) to 24 inches (0.6 m), and a tube wall thickness of around between 1/8 inch (0.31 cm) to 3/8 inch (0.95 cm).

According to an exemplary embodiment, a 400 (10.1 m) inch evacuation slide for an aircraft includes a telescoping structural support comprising carbon fiber having a tensile strength of 500,000 psi (3,447,378 kPa). The structural support includes 33 tubes, each approximately 12 inches (0.3 m) in length, and with a wall thickness of approximately 1/8 inch (0.31 cm) for each tube. The first tube has a diameter of about 8.4 inches (0.21 cm), and the diameter of the smallest tube is around 1.25 inches (03 m). The angle of the deployed slide is about 28 degrees, where the term about in this context only means+/−5 degrees.

Figure 6A:
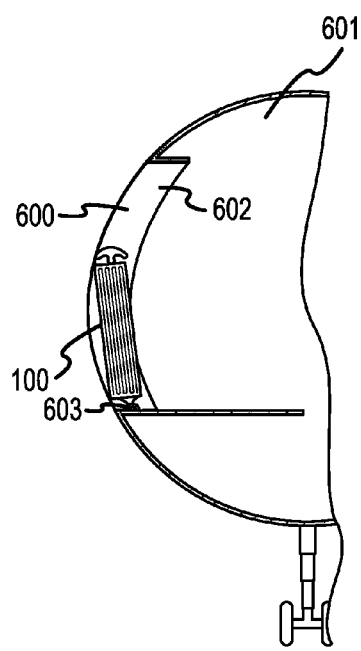
FIG. 6A shows the emergency slide system packed and held within the door, according to various embodiments.
Figure 6B:
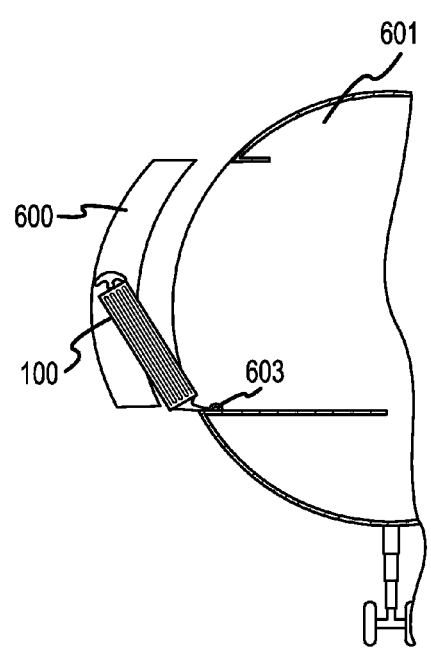
FIG. 6B shows the emergency slide system in the process of deployment, as the door of the aircraft is opened, according to various embodiments.
Figure 6C:
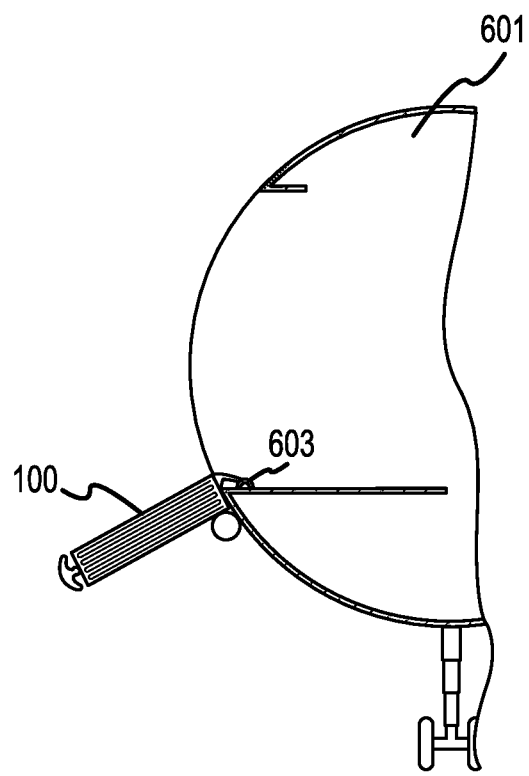
FIG. 6C shows the emergency slide system falling from the aircraft door, according to various embodiments.
Figure 6D:
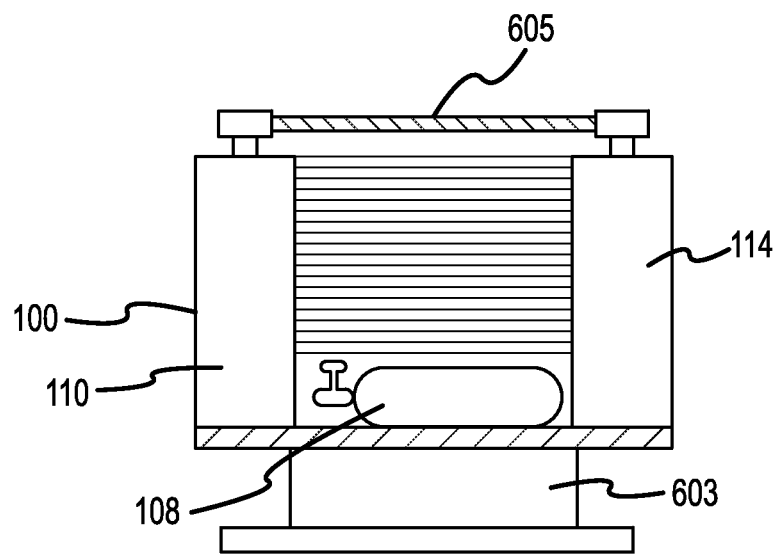
FIG. 6D shows the emergency slide system comprising a tie structure, according to various embodiments.

Gas deployment device 105 may comprise a gas generator 107, a compressed gas cylinder 108, or both, according to various embodiments. Gas deployment device 105 may further include an aspirator 109. According to various embodiments, combining the gas generator 107, compressed gas cylinder 108, and aspirator 109 may be advantageous in providing rapid actuation. With reference to FIGS. 6A, 6B, 6C and 6D, according to various embodiments, emergency slide system 100 is packed and held within a storage compartment 600 preferably comprising a door of an aircraft 601, preferably inside a slide bustle 602, and is attached to the aircraft via, for example, a girt. According to various embodiments, a tie structure 605 may join first rail 110 to second rail 114, in order to prevent relative rotation and deflection. Deployment of emergency slide system 100 in an aircraft is actuated in response to the storage compartment 600 opening (see FIG. 6B). As shown in FIG. 6C, once the storage compartment 600 (shown as a door in the figures) opens, the force of gravity causes emergency slide system 100 to fall from the aircraft storage compartment 600, upon which gas deployment device 105 is automatically actuated, causing emergency slide system 100 to deploy. According to various embodiments, the storage compartment 600 for storing packed emergency slide system 100 may comprise a door, a cover (e.g. decorative cover) attached to the door of the aircraft, or separate storage unit wherein the emergency slide system 100 within its separate storage unit can be installed at various locations, e.g. passenger ships, buildings, etc.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An emergency slide system comprising:
a slide including a telescoping structural support, and a fabric wrap; and
a gas deployment device configured to deploy said slide;
wherein said telescoping structural support comprises a first rail and a second rail forming longitudinal borders of said slide, said first rail comprising a first set of telescoping segments, and said second rail comprising a second set of telescoping segments, wherein corresponding telescoping segments of the first set of telescoping segments and the second set of telescoping segments are attached to one another via an attachment segment, wherein the attachment segment comprises a first loop that wraps around the first set of telescoping segments and a second loop that wraps around the second set of telescoping segments, wherein said first set of telescoping segments comprise a plurality of interlocking nested tubes, the plurality of interlocking nested tubes having a closed bottom end and an open top end, wherein deployment of said first set of telescoping segments is effectuated by forcing gas through said open end, wherein said fabric wrap comprises a slide surface and comprises a closed bottom end and an opened top end, wherein said fabric wrap envelopes the telescoping structural support and the attachment segment.

2. The emergency slide system of claim 1, wherein said gas deployment device is configured to force gas through said open end.

3. The emergency slide system of claim 1, wherein said emergency slide system is a component of an aircraft.

4. The emergency slide system of claim 1, said gas deployment device comprising at least one of a gas generator, a compressed gas cylinder, or a combination thereof.

5. The emergency slide system of claim 1, said emergency slide system being configured to pack within a storage compartment.

6. The emergency slide system of claim 5, said emergency slide system configured to deploy upon opening said storage compartment.

7. The emergency slide system of claim 1, wherein the attachment segment is rigid.

8. An emergency slide system comprising:
a slide including a telescoping structural support, and a fabric wrap; and
a gas deployment device configured to deploy said slide;
wherein said telescoping structural support comprises a first rail and a second rail forming longitudinal borders of said slide, said first rail comprising a first set of telescoping segments having a closed bottom end and an open top end, and said second rail comprising a second set of telescoping segments, wherein deployment of said first set of telescoping segments is effectuated by forcing gas through said open end, wherein corresponding telescoping segments of the first set of telescoping segments and the second set of telescoping segments are attached to one another via an attachment segment, wherein the attachment segment comprises a first loop that wraps around the first set of telescoping segments and a second loop that wraps around the second set of telescoping segments, wherein said fabric wrap comprises a slide surface and comprises a closed bottom end and an opened top end, wherein said fabric wrap envelopes the telescoping structural support and the fabric wrap also envelopes the attachment segment.

* * * * *